US012812312B2

(12) United States Patent
Zhang

(10) Patent No.: US 12,812,312 B2
(45) Date of Patent: Nov. 24, 2026

(54) METHOD OF DETECTING EARPHONE STATE, EARPHONE, AND COMPUTER-READABLE STORAGE MEDIUM

(71) Applicant: GOERTEK TECHNOLOGY CO., LTD., Qingdao (CN)

(72) Inventor: Rui Zhang, Qingdao (CN)

(73) Assignee: GOERTEK TECHNOLOGY CO., LTD., Qingdao (CN)

( * ) Notice: Subject to any disclaimer, the term of this patent is extended or adjusted under 35 U.S.C. 154(b) by 199 days.

(21) Appl. No.: 18/773,664

(22) Filed: Jul. 16, 2024

(65) Prior Publication Data

US 2024/0373182 A1 Nov. 7, 2024

Related U.S. Application Data

(63) Continuation of application No. PCT/CN2022/099675, filed on Jun. 20, 2022.

(30) Foreign Application Priority Data

Feb. 28, 2022 (CN) ......................... 202210190643.1

(51) Int. Cl.
*H04R 29/00* (2006.01)
*H04R 1/10* (2026.01)

(52) U.S. Cl.
CPC ......... *H04R 29/001* (2013.01); *H04R 1/1041* (2013.01)

(58) Field of Classification Search
CPC .................................................... H04R 1/1041
See application file for complete search history.

(56) References Cited

U.S. PATENT DOCUMENTS

2009/0296952 A1 12/2009 Pantfoerder et al.
2013/0121494 A1* 5/2013 Johnston ............. H04R 1/1041 381/56

(Continued)

FOREIGN PATENT DOCUMENTS

CN 103167365 A 6/2013
CN 103838355 A 6/2014

(Continued)

OTHER PUBLICATIONS

First Office Action in Corresponding Chinese Application No. 202210190643.1, dated Oct. 26, 2022; 13 pgs.

(Continued)

*Primary Examiner* — James K Mooney
(74) *Attorney, Agent, or Firm* — HAUPTMAN HAM, LLP

(57) ABSTRACT

Disclosed are a method of detecting earphone state, an earphone and a computer-readable storage medium. The method includes: acquiring a plurality of first signal parameters detected in response to that an earphone is in a preset mode, in the preset mode, the earphone is in a worn state or the earphone is switched between the worn state and an unworn state, and different first signal parameters are configured to correspond to different preset positions on the earphone; determining at least one preset position among a plurality of preset positions as a first target position according to the plurality of first signal parameters; detecting second signal parameters of the first target position to acquire at least one second signal parameter; and determining state information of the earphone according to the at least one second signal parameter.

9 Claims, 3 Drawing Sheets

(56) References Cited

U.S. PATENT DOCUMENTS

| | | | | |
|---|---|---|---|---|
| 2020/0100010 | A1* | 3/2020 | Yang | H04R 1/10 |
| 2021/0342032 | A1* | 11/2021 | Guo | G06F 3/0443 |

FOREIGN PATENT DOCUMENTS

| | | | |
|---|---|---|---|
| CN | 110333528 | A | 10/2019 |
| CN | 110381407 | A | 10/2019 |
| CN | 110447242 | A | 11/2019 |
| CN | 112055296 | A | 12/2020 |
| CN | 113473292 | A | 10/2021 |
| EP | 2990943 | A1 | 3/2016 |
| WO | 2016045088 | A1 | 3/2016 |
| WO | 2018018415 | A1 | 2/2018 |
| WO | 2019100378 | A1 | 5/2019 |

OTHER PUBLICATIONS

Grant Notification in Corresponding Chinese Application No. 202210190643.1, dated Mar. 29, 2023; 3 pgs.

International Search Report and Written Opinion in Corresponding International Application No. PCT/CN2022/099675, mailed Nov. 30, 2022; 12 pgs.

* cited by examiner

METHOD OF DETECTING EARPHONE STATE, EARPHONE, AND COMPUTER-READABLE STORAGE MEDIUM

CROSS-REFERENCE TO RELATED APPLICATIONS

The present application is a continuation application of International Application No. PCT/CN2022/099675, filed on Jun. 20, 2022, which claims priority to Chinese patent application No. 202210190643.1, entitled in "METHOD OF DETECTING EARPHONE STATE, EARPHONE, AND COMPUTER READABLE STORAGE MEDIUM" and filed on Feb. 28, 2022. The disclosures of the above-mentioned applications are incorporated herein by reference in their entireties.

TECHNICAL FIELD

The present application relates to the technical field of earphones, and in particular to a method of detecting earphone state, an earphone, and a computer-readable storage medium.

BACKGROUND

With the development of economy and technology and the improvement of people's living standards, the application of earphones is becoming more and more extensive, and the degree of intelligence of earphones is also getting higher and higher. Most earphones will be equipped with a detection module to detect whether the earphone is worn or taken off, so as to control the operation of the earphone based on the detected state, such as playing audio when it is detected that the earphone is worn, and stopping to play audio when it is detected that the earphone is taken off.

At present, the detection module on the earphone generally has 1 to 2 fixed positions. During the detection process, the state of the earphone being worn or taken off is detected by comparing the signals detected by these 1 to 2 fixed detection positions with the preset signal threshold. However, there are differences in the structure of the ears of different users. The fixed detection position will easily lead to the detection deviation of the determined earphone state due to the mismatch between the detected signal and the actual structure of the user's ear, which will affect the accuracy and sensitivity of detecting the state of the earphone related to wearing.

SUMMARY

The main purpose of the present application is to provide a method of detecting earphone state, an earphone and a computer-readable storage medium, aiming at improving the accuracy and sensitivity of detecting the state of the earphone related to wearing.

In order to achieve the above object, the present application provides a method of detecting earphone state, including:

acquiring a plurality of first signal parameters detected in response to that an earphone is in a preset mode, in the preset mode, the earphone is in a worn state or the earphone is switched between the worn state and an unworn state, and different first signal parameters are configured to correspond to different preset positions on the earphone;

determining at least one preset position among a plurality of preset positions as a first target position according to the plurality of first signal parameters;

detecting second signal parameters of the first target position to acquire at least one second signal parameter; and determining state information of the earphone according to the at least one second signal parameter, the state information indicates whether the earphone is switched between the worn state and the unworn state.

In an embodiment, the determining at least one preset position among the plurality of preset positions as the first target position according to the plurality of first signal parameters includes:

determining a preset number of target parameters among the plurality of first signal parameters, the preset number of target parameters is greater than other first signal parameters among the plurality of first signal parameters; and determining the preset position corresponding to each target parameter as the first target position respectively.

In an embodiment, after the determining at least one preset position among the plurality of preset positions as the first target position according to the plurality of first signal parameters, the method further includes:

determining the preset position other than the first target position among the plurality of preset positions as a second target position;

detecting a third signal parameter of the second target position, and performing the detecting the second signal parameter of the first target position to acquire at least one second signal parameter;

determining whether the earphone is in a target state according to the third signal parameter, or determining whether the earphone is in the target state according to the third signal parameter and the second signal parameter; the target state is a earphone state switching caused by contact between the earphone and an object other than the ear;

in response to that the earphone is not in the target state, performing the determining the state information of the earphone according to the at least one second signal parameter; and in response to that the earphone is in the target state, determining that the earphone is not switched between the worn state and the unworn state.

In an embodiment, the determining whether the earphone is in the target state according to the third signal parameter includes:

in response to that the third signal parameter is greater than a first target signal parameter, determining that the earphone is in the target state; in response to that the third signal parameter is less than or equal to the first target signal parameter, determining that the earphone is not in the target state; or the determining whether the earphone is in the target state according to the third signal parameter and the second signal parameter includes:

in response to that both the second signal parameter and the third signal parameter are greater than the first target signal parameter, determining that the earphone is in the target state; in response to that the second signal parameter is greater than the first target signal parameter, and the third signal parameter is less than or equal to the first target signal parameter, determining that the earphone is not in the target state.

In an embodiment, after the determining the preset position other than the first target position among the plurality of preset positions as the second target position, the method further includes:

increasing the first signal parameter corresponding to the second target position according to a preset parameter adjustment value to acquire the first target signal parameter.

In an embodiment, the determining the state information of the earphone according to the at least one second signal parameter includes:

determining a parameter difference between each of the second signal parameters and a second target signal parameter, and acquiring at least one parameter difference; the second target signal parameter is a target value that a signal parameter detected by the first target position needs to reach in response to that the earphone is switched between the worn state and the unworn state;

in response to that all parameter differences are less than or equal to a set threshold, determining that the state information is that the earphone is switched between the worn state and the unworn state; and in response to that any parameter difference among all parameter differences is greater than the set threshold, determining that the state information is that the earphone is not switched between the worn state and the unworn state.

In an embodiment, before the determining the parameter difference between each of the second signal parameters and the second target signal parameter, and acquiring at least one parameter difference, the method further includes:

determining the second target signal parameter according to the first signal parameter corresponding to each of the first target positions.

In an embodiment, after the determining the state information of the earphone according to the at least one second signal parameter, the method further includes:

acquiring fourth signal parameters corresponding to each first target position on the earphone in response to that the earphone is switched between the worn state and the unworn state detected multiple times before a current moment, and acquiring a plurality of fourth signal parameters corresponding to each first target position respectively; and adjusting the second target signal parameter according to the plurality of fourth signal parameters corresponding to each first target position respectively.

In an embodiment, a number of the first target position is more than one; after the determining the state information of the earphone according to the at least one second signal parameter, the method further includes: returning to the performing the detecting the second signal parameter of the first target position to acquire at least one second signal parameter;

in a process of cyclically determining the state information of the earphone, at the same time or after the in response to that any parameter difference among all parameter differences is greater than the set threshold, determining that the state information is that the earphone is not switched between the worn state and the unworn state, the method further includes:

in response to that the first target position meets a preset condition, updating a number of statistics corresponding to the first target position meeting the preset condition;

in response to that there is the first target position whose statistical number is greater than a number of sets, returning to the performing the acquiring the plurality of first signal parameters detected in response to that the earphone is in the preset mode; and in response to that there is no first target position whose statistical number is greater than or equal to the number of sets, returning to the performing the detecting second signal parameters of the first target position to acquire at least one second signal parameter; the preset condition is that the parameter difference corresponding to the first target position is less than or equal to the set threshold; each first target position has a corresponding statistical number, and the statistical number represents: the number of times that a corresponding first target position satisfies the preset condition, in response to that the state information of the earphone is determined several times before a current moment to be that the earphone is not switched between the worn state and the unworn state.

In an embodiment, the acquiring the plurality of first signal parameters detected in response to that the earphone is in the preset mode includes:

in response to that the earphone is in the preset mode, outputting prompt information so that the earphone is switched between the worn state and the unworn state;

acquiring a first signal value and a second signal value detected at each preset position on the earphone, the first signal value is a signal value detected in response to that the earphone is in the worn state, and the second signal value is a signal value detected in response to that the earphone is in the unworn state; and determining the first signal parameter corresponding to each preset position according to the signal difference between the first signal value and the second signal value at each preset position, and acquiring the plurality of first signal parameters.

In addition, in order to achieve the above object, the present application provides an earphone, including:

a wearing part, configured to cooperate with an ear;

a detection module; a plurality of detection modules are provided, and the plurality of detection modules are distributed and arranged at different preset positions on the wearing part; and a control device connected to each of the detection modules; the control device includes: a memory, a processor, and an earphone state detection program stored in the memory and operable on the processor, and when the earphone state detection program is executed by the processor, the steps of the method of detecting earphone state are realized.

In addition, in order to achieve the above object, the present application provides a computer-readable storage medium, an earphone state detection program is stored on the computer-readable storage medium, and when the earphone state detection program is executed by a processor, the steps of the method of detecting earphone state are realized.

A method of detecting earphone state is provided by the present application. The method acquires the first signal parameters corresponding to different preset positions on the earphone detected when the earphone is in the worn state or switched between the worn state and the unworn state; according to the acquired multiple first signal parameters, the detection signal from multiple preset positions is determined to represent the first target position of the earphone state information; and it is determined whether the earphone is switched between the worn state and the unworn state according to the second signal parameters detected at the first target position. In this process, the detection position used to determine the earphone state information is not fixed, but is determined according to the signals detected at different positions when the earphone is actually worn and taken off. The signal condition detected at different preset positions can accurately reflect the actual ear structure of the user of the earphone. Thus, it can be ensured that the signal detected at the determined first target position can accurately reflect the action of the user actually wearing the earphone or taking off the earphone. The accuracy of the earphone state information detected based on the first target position is ensured, thereby effectively improving the accuracy and sensitivity of detecting the state of the earphone related to wearing.

The realization of the purpose of the present application, functional characteristics and advantages will be further described in conjunction with the embodiments and with reference to the accompanying drawings.

DETAILED DESCRIPTION OF THE EMBODIMENTS

It should be understood that the specific embodiments described here are only used to explain the present application, not to limit the present application.

The main solution of the embodiment of the present application is as follows: acquiring a plurality of first signal parameters detected in response to that an earphone is in a preset mode; in the preset mode, the earphone is in a worn state or the earphone is switched between the worn state and an unworn state, and different first signal parameters are configured to correspond to different preset positions on the earphone; determining at least one preset position among a plurality of preset positions as a first target position according to the plurality of first signal parameters; detecting second signal parameters of the first target position to acquire at least one second signal parameter; and determining state information of the earphone according to the at least one second signal parameter, the state information indicates whether the earphone is switched between the worn state and the unworn state.

In the related art, in the state detection process related to earphone wearing, the fixed detection position will easily lead to the detection deviation of the determined earphone state due to the mismatch between the detected signal and the actual structure of the user's ear, which will affect the wear-related state accuracy and sensitivity of detecting the earphone.

The present application provides the above-mentioned solution, aiming at improving the accuracy and sensitivity of detecting the wearing-related state of the earphone.

An embodiment of the present application provides an earphone. In the embodiment of the present application, the earphone may be a wired earphone or a wireless earphone.

Figure 1:
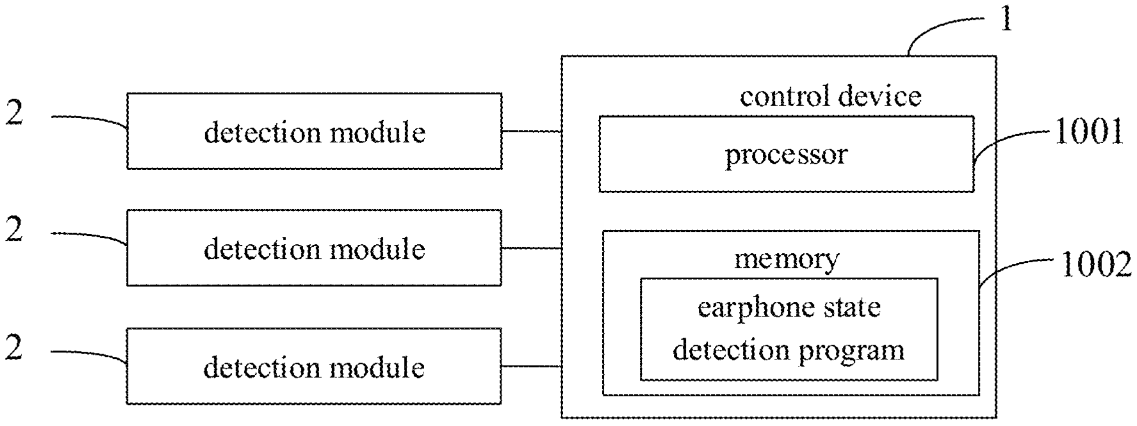
FIG. 1 is a schematic diagram of a hardware structure involved in the operation of an earphone according to an embodiment of the present application.

In the embodiment of the present application, referring to FIG. 1, the earphone includes a wearing part, a detection module 2 and a control device 1.

The wearing part is used to cooperate with the ear, and the wearing part is attached to the ear when the earphone is in the worn state; the wearing part is separated from the ear when the earphone is in the unworn state.

The number of the detection modules 2 is multiple, and the multiple detection modules 2 are distributed at different preset positions on the wearing part, and each preset position corresponds to a detection module 2.

The control device 1 is connected to each of the detection modules 2. The control device 1 includes: a processor 1001 (such as a CPU), and a memory 1002. The components in the control device 1 are connected via a communication bus. The memory 1002 can be a high-speed RAM memory, or a stable memory (non-volatile memory), such as a disk memory. Optionally, the memory 1002 may also be a storage device independent of the foregoing processor 1001.

Those skilled in the art can understand that the device structure shown in FIG. 1 does not constitute a limitation to the device, and may include more or less components than shown in the figure, or combine some components, or arrange different components.

As shown in FIG. 1, the memory 1002 as a computer-readable storage medium may include an earphone state detection program. In the device shown in FIG. 1, the processor 1001 can be used to call the earphone state detection program stored in the memory 1002, and execute related steps of the method of detecting earphone state in the following embodiments.

An embodiment of the present application also provides a method of detecting earphone state, which is applied to the above earphone.

Figure 2:
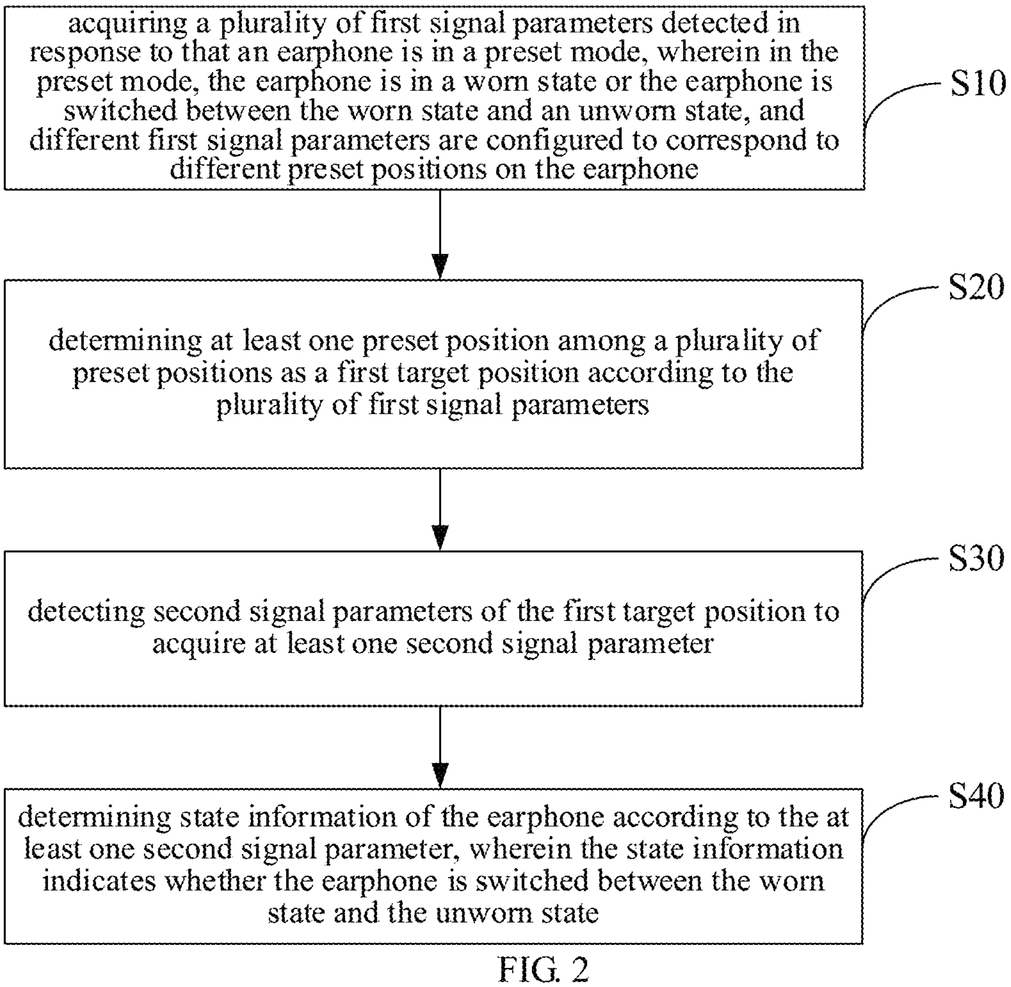
FIG. 2 is a schematic flowchart of a method of detecting earphone state according to an embodiment of the present application.

Referring to FIG. 2, an embodiment of the method of detecting earphone state of the present application is provided. In this embodiment, the method of detecting earphone state includes:

Step S10, acquiring a plurality of first signal parameters detected in response to that an earphone is in a preset mode, in the preset mode, the earphone is in a worn state or the earphone is switched between the worn state and an unworn state, and different first signal parameters are configured to correspond to different preset positions on the earphone;

The preset mode is specifically a preset earphone operation mode for selecting at least one preset position from a plurality of preset positions on the earphone as the wearing detection position of the earphone.

The first signal parameter is specifically a signal parameter used to represent a state of whether a preset position on the wearing part of the earphone is touched, and a different value of the first signal parameter represents a different state of the corresponding preset position. The first signal parameter may include a pressure parameter or the like.

The wearing part on the earphone is provided with a plurality of preset positions, and each preset position is provided with a detection module, and each detection module corresponds to a first signal parameter. The multiple first signal parameters include signal parameters detected at each preset position in the preset mode in all the preset positions on the earphone.

Specifically, when the earphone and the terminal are in a bound state, based on the terminal receiving a preset mode activation instruction input by the user, when receiving the activation instruction sent by the terminal, the earphone is controlled to enter the preset mode; and in the preset mode, the multiple first signal parameters here are determined according to the data respectively detected by the multiple detection modules on the earphone. In other embodiments, the earphone can also enter the preset mode when it detects that the operation reaches the set condition (for example, when the bound terminal changes).

In this embodiment, the earphone is switched between the worn state and the unworn state in the preset mode, and the first signal parameter is the signal change value detected by the detection module at the corresponding preset position of the earphone during the state switching process. In other embodiments, the earphone is in the worn state in the preset mode, and the first signal parameter is the signal value detected by the detection module at the corresponding preset position of the earphone in the worn state.

Specifically, switching between the worn state and the unworn state includes: switching from the worn state to the unworn state (i.e, the earphone is taken off) and/or switching from the unworn state to the worn state (i.e, the earphone is worn).

Step S20, determining at least one preset position among a plurality of preset positions as a first target position according to the plurality of first signal parameters;

In this embodiment, the number of first target positions is less than the number of preset positions. The number of first target positions can be set according to actual conditions, and can be a preset fixed value, or a value determined based on user input parameters, such as 1, 2, 3, and so on. The number of preset positions is a preset fixed value, and the specific number can be set according to actual conditions, for example, the number of preset positions can be 3, 4, 10, etc.

Specifically, at least one preset position among the plurality of preset positions is determined as the first target position according to the magnitude relationship among the first signal parameters among the plurality of first signal parameters. The characteristic signal parameters corresponding to the plurality of first signal parameters may also be calculated, and at least one preset position among the plurality of preset positions is determined as the first target position according to the difference between the characteristic signal parameters and each first signal parameter.

In other embodiments, the number of first target positions may also be equal to the number of preset positions, for example, if a plurality of detected first signal parameters are greater than a set threshold, it may be determined that all preset positions are the first target position.

Step S30, detecting second signal parameters of the first target position to acquire at least one second signal parameter;

Specifically, after the first target position is determined, the signal parameters detected by the detection module at the first target position are acquired in real time as the second signal parameter, and at least one second signal parameter is acquired. The number of second signal parameters is the same as the number of first target positions.

The second signal parameter is specifically a signal parameter used to represent whether the first target position on the wearing part of the earphone is touched or not, and different values of the first signal parameter represent different states of the corresponding first target position. The second signal parameter is a parameter of the same type as the first signal parameter, and the second signal parameter may include a pressure parameter and the like.

Step S40, determining state information of the earphone according to the at least one second signal parameter; the state information indicates whether the earphone is switched between the worn state and the unworn state.

In this embodiment, it is determined according to at least one second signal parameter whether the earphone is switched from the unworn state to the worn state (that is, whether the earphone is worn). In other embodiments, it may also be determined according to at least one second signal parameter whether the earphone is switched from the worn state to the unworn state (that is, whether the earphone is taken off).

An method of detecting earphone state is provided by an embodiment of the present application. The method acquires first signal parameters corresponding to different preset positions on the earphone detected when the earphone is in the worn state or switched between the worn state and the unworn state; the first target position where the detection signal is used to represent the state information of the earphone from a plurality of preset positions is determined according to the acquired multiple first signal parameters; whether the earphone is switched between the worn state and the unworn state is determined according to the second signal parameters detected at the first target position. In this process, the detection position used to determine the state information of the earphones is not fixed, but is determined according to the signals detected by the earphones at different positions when they are actually worn and taken off. The signal conditions detected at different preset positions can accurately reflect the actual ear structure of the user of the earphone, so it can be ensured that the signal detected at the determined first target position can accurately reflect the actual wearing of the earphone by the user of the earphone or taking off the earphone, and ensured that the accuracy of the earphone state information detected based on the first target position, thereby effectively improving the accuracy and sensitivity of detecting the state of the earphone related to wearing.

Figure 3:
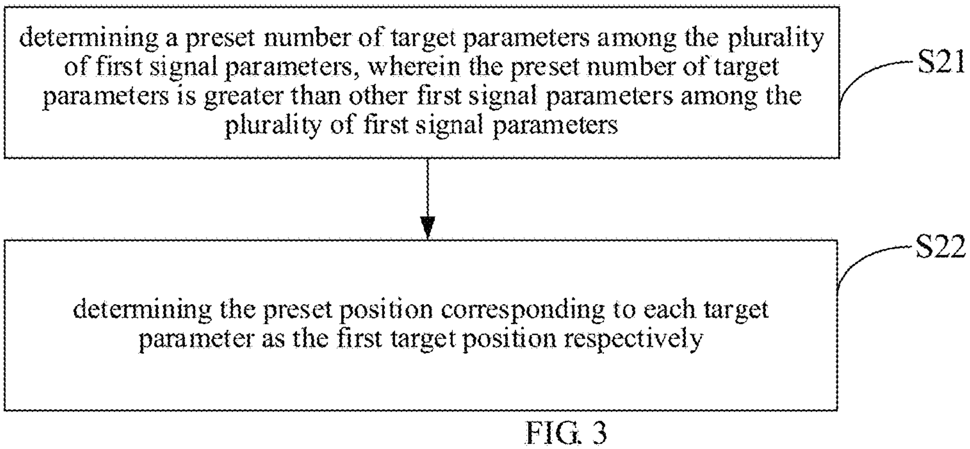
FIG. 3 is a schematic flowchart of the method of detecting earphone state according to another embodiment of the present application.

Further, based on the above-mentioned embodiments, another embodiment of the method of detecting earphone state of the present application is provided. In this embodiment, referring to FIG. 3, the step S20 includes:

Step S21, determining a preset number of target parameters among the plurality of first signal parameters; the preset number of target parameters being greater than other first signal parameters among the plurality of first signal parameters;

The preset number here can be set by the user, or can be a parameter set in the system. The preset number can be one or more than one. For example, the preset number can be 1, 2 or 4, etc.

Specifically, all the first signal parameters among the plurality of first signal parameters can be compared pairwise, the plurality of first signal parameters are arranged in order from large to small, and the preset number of first signal parameters arranged in front are used as target parameter. The parameter with the smallest value among the preset number of first signal parameters is greater than any other first signal parameter except the preset number of target parameters among all the first signal parameters.

In step S22, determining the preset position corresponding to each target parameter as the first target position respectively.

For example, there are N preset positions, and the first signal parameters corresponding to each preset position are shown in the following table:

| preset position | first signal parameter |
|---|---|
| position 1 | 300 |
| position 2 | 900 |
| . . . | . . . |
| position N | 880 |

Based on the above table, when the preset number is 2, the two signal parameters with the largest first signal parameters among all the first signal parameters are 900 and 880 respectively, then the position 2 corresponding to 900 and the position N corresponding to 880 are respectively used as the first target position to acquire 2 first target positions; when the preset number is 1, the signal parameter with the largest first signal parameter among all first signal parameters is 900, then the position 2 corresponding to 900 is taken as the first target position to acquire 1 first target position.

In this embodiment, the preset position corresponding to the largest preset number of signal parameters among the multiple signal parameters detected in the preset mode is used as the first target position for detecting the state of the earphone, and a large signal parameter indicates that the user is in contact with this position when wearing the earphone. Based on this, it can be ensured that the preset position that actually touches the user's ear while wearing the earphone will be used to determine whether the earphone is switched between the worn state and the unworn state. This helps to ensure that the signal detection process of the earphone state information can be accurately matched with the user's actual ear structure, and further effectively improves the accuracy and sensitivity of detecting the state of the earphone related to wearing.

Figure 4:
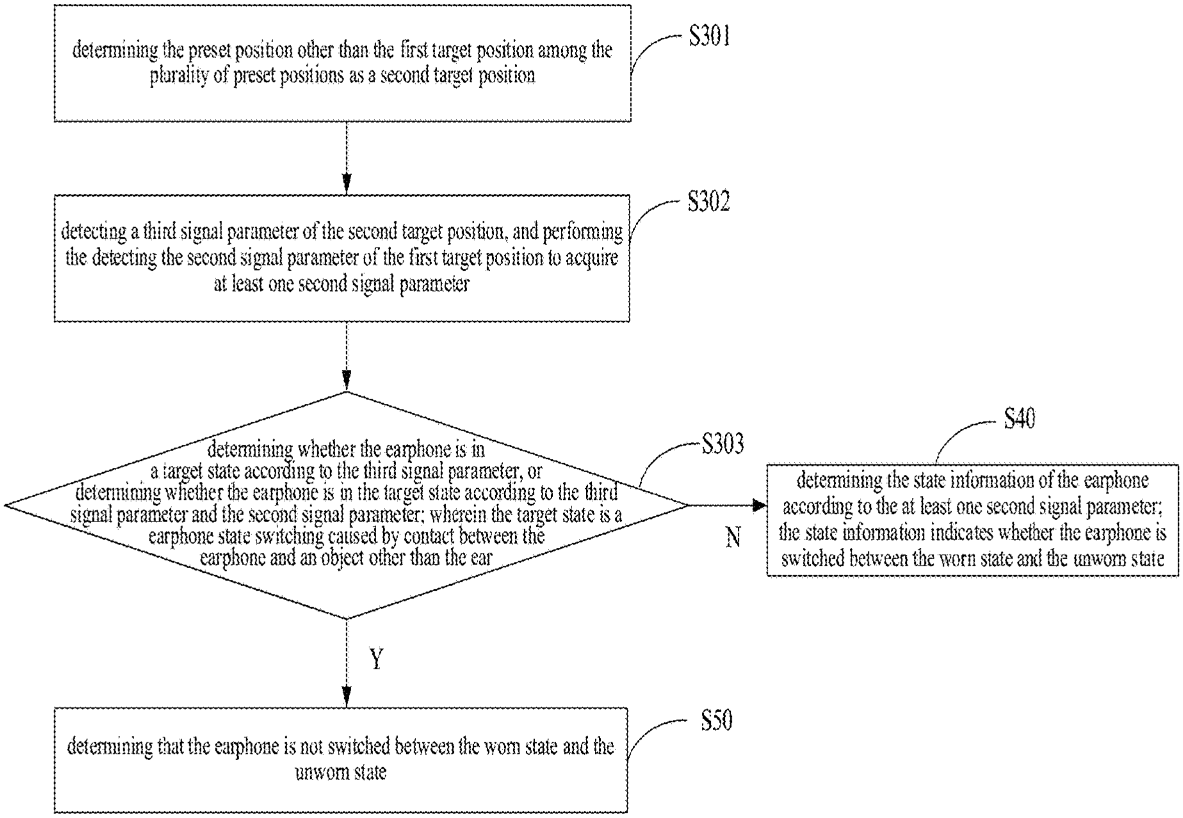
FIG. 4 is a schematic flowchart of the method of detecting earphone state according to another embodiment of the present application.

Further, based on any of the above-mentioned embodiments, another embodiment of the method of detecting earphone state of the present application is provided. In this embodiment, referring to FIG. 4, after the step S20, it also includes:

Step S301, determining a preset position other than the first target position among the plurality of preset positions as a second target position;

Specifically, all or part of the preset positions except the first target position among the plurality of preset positions may be determined as the second target position. Further, a set number of preset positions other than the first target position among the plurality of preset positions may be determined as the second target position.

Step S302, detecting the third signal parameter of the second target position, and performing the step of detecting the second signal parameter of the first target position to acquire at least one second signal parameter:

The third signal parameter is specifically a signal parameter used to represent the state of whether the second target position on the wearing part of the earphone is touched, and the different value of the third signal parameter indicates that the state of the corresponding second target position is different. The third signal parameter is a parameter of the same type as the above-mentioned first signal parameter and the second signal parameter, and the third signal parameter may include a pressure parameter and the like.

The second signal parameter of the first target position in the above embodiment and the third signal parameter in this embodiment can be detected simultaneously or sequentially. Specifically, when the second signal parameter reaches a preset condition (for example, when the second signal parameter is greater than the preset parameter threshold or the parameter difference between the second signal parameter and the subsequent second target signal parameter is smaller than the set threshold), the signal parameter detected by the detection module at the second target position is read as the third signal parameter. Alternatively, the third signal parameter may also be detected while the second signal parameter is detected. Alternatively, the third signal parameter may be detected first, and then the second signal parameter may be detected when it is determined according to the third signal parameter that the earphone is not in the target state.

Step S303, determining whether the earphone is in a target state according to the third signal parameter, or determining whether the earphone is in a target state according to the third signal parameter and the second signal parameter; the target state is the earphone state switching caused by contact between the above-mentioned earphone and objects other than the ear;

For example, the target state may be the state in which the user's fingers hold the earphone wearing part, or the target state may be the state in which the earphone wearing part is in contact with the desktop.

Specifically, whether the earphone is in the target state can be determined solely according to the third signal parameter detected by the second target position, or whether the earphone is in the target state can also be determined in combination with the third signal parameter and the second signal parameter.

In this embodiment, when the third signal parameter is greater than the first target signal parameter, it is determined that the earphone is in the target state; when the third signal parameter is less than or equal to the first target signal parameter, it is determined that the earphone is not in the target state. When the number of the second target positions is more than one, the corresponding number of the third signal parameters is more than one; and when the number of the third signal parameters greater than the first target signal parameter is greater than or equal to the first set threshold, it is determined that the earphone is in the target state; when the number of the third signal parameters greater than the first target signal parameter is less than the first set threshold (that is, the number of the third signal parameters less than or equal to the first target signal parameter is greater than or equal to the second set threshold), it is determined that the earphone is not in the target state.

In other embodiments, when both the second signal parameter and the third signal parameter are greater than the first target signal parameter, it is determined that the earphone is in the target state; when the second signal parameter is greater than the first target signal parameter, and when the third signal parameter are less than or equal to the first target signal parameter, it is determined that the earphone is not in the target state. When the number of the second target position is more than one, the corresponding third signal parameter is more than one; when the number of the third signal parameter greater than the first target signal parameter can be greater than or equal to the first set threshold, and when at least one second signal parameter is greater than the first target signal parameter, it is determined that the earphone is in the target state; when the number of the third signal parameter greater than the first target signal parameter is less than the first set threshold (that is, the number of the third signal parameters less than or equal to the first target signal parameter is greater than or equal to the second set threshold), and at least one second signal parameter is greater than the first target signal parameter, it is determined that the earphone is not in the target state.

The first target signal parameter here may be a preset fixed signal parameter value, or may be a parameter determined according to the first signal parameter corresponding to the second target position. In this embodiment, in order to improve the accuracy of determining the target state, the first signal parameter corresponding to the second target position is increased according to a preset parameter adjustment value to acquire the first target signal parameter. Specifically, in this embodiment, the first target signal parameter is smaller than the first signal parameter corresponding to the first target position. In other embodiments, the first target signal parameter may also be equal to the first signal parameter corresponding to the first target position.

If the earphone is not in the target state, step S40 is performed; if the earphone is in the target state, step S50 is performed.

Step S50, determining that the earphone is not switched between the worn state and the unworn state.

In this embodiment, by determining the second target position, the third signal parameter detected by the second target position is used to assist detection of the state information of the earphone, and the third signal parameter is used to determine whether there are other actions that have nothing to do with wearing cause the state of the earphone to change. The second signal parameter detected by the first target position is used to determine whether the earphone is switched between the worn state and the unworn state when it is confirmed that there are no other actions that have nothing to do with wearing that cause the state of the earphone to change, which can effectively avoid the accuracy of the recognition result of the earphone state information affected by the accidental touch of the earphone, thereby further improving the accuracy and sensitivity of detecting the state of the earphone related to wearing.

Further, in this embodiment, after step S40 or step S50, the fifth signal parameter corresponding to each second target position on the earphone is acquired when the earphone is switched between the worn state and the unworn state detected multiple times before the current moment, and a plurality of fifth signal parameters corresponding to each second target position are acquired; and the first target signal parameter is adjusted according to the plurality of fifth signal parameters corresponding to each second target position. Here, the specific number of times may be a preset fixed number of times, or may be a number of times determined according to an instruction input by the user. In this embodiment, the number of times is 50 times, and in other embodiments, the number of times may be 30 times, 40 times, etc. In each detection process, each second target position corresponds to detection of at least one fifth signal parameter. Specifically, the mean value or maximum value of multiple fifth signal parameters may be determined as the second signal characteristic value, and the smaller value of the second signal characteristic value and the first target signal parameter may be determined as the new first target signal parameter. Since the position of the user wearing the earphone may change during actual use, this change is a habitual change, which is related to wearing comfort, ambient temperature, humidity, etc. This embodiment adjusts the first target signal parameter by the fifth signal parameter acquired through multiple detections before the current time, which is beneficial to improving the accuracy of false touch detection that is not related to wearing of the earphone, thereby further improving the accuracy of identifying state information related to wearing of the earphone.

Figure 5:
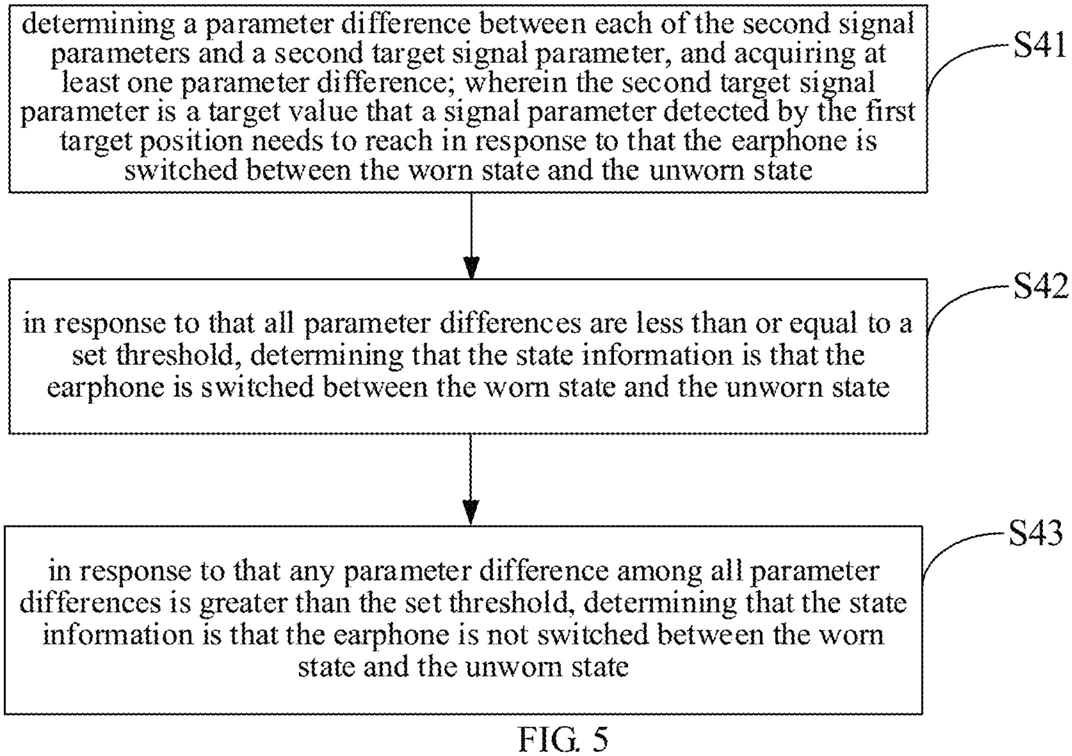
FIG. 5 is a schematic flowchart of the method of detecting earphone state according to another embodiment of the present application.

Further, based on any of the above-mentioned embodiments, another embodiment of the method for detecting the earphone state of the present application is provided. In this embodiment, referring to FIG. 5, the S40 includes:

Step S41, determining the parameter difference between each of the second signal parameters and the second target signal parameter, and acquiring at least one parameter difference; the second target signal parameter is the target value that the signal parameter detected by the first target position needs to achieve when the earphone is switched between the worn state and the unworn state;

Different first target positions may correspond to different second target signal parameters, and different first target positions may also correspond to the same second target signal parameters. Each second signal parameter corresponds to a parameter difference, the first target position is in one-to-one correspondence with the second signal parameter, and the second signal parameter is in one-to-one correspondence with the parameter difference. By determining the parameter difference between each second signal parameter and its corresponding second target signal parameter, the parameter difference corresponding to each first target position can be acquired.

The second target signal parameter may be a preset fixed parameter value, or may be a parameter value determined according to the first signal parameter corresponding to the first target position. In this embodiment, in order to improve the accuracy of earphone state information detection, the second target signal parameter is determined according to the first signal parameter corresponding to each of the first target positions. Specifically, the average value of the first signal parameters corresponding to all first target positions can be used as the second target signal parameter; or the first signal parameter with the smallest value among the first signal parameters corresponding to all first target positions can be used as the second target signal parameter.

Step S42, when all the parameter differences are less than or equal to the set threshold, determining that the state information is that the earphone is switched between the worn state and the unworn state;

Step S43, when any parameter difference among all parameter differences is greater than the set threshold, determining that the state information is that the earphone is not switched between the worn state and the unworn state.

In this embodiment, based on the parameter difference between the second signal parameter and the second target signal parameter to distinguish whether the earphone is switched between the worn state and the unworn state, it is beneficial to further improving the accuracy of the acquired earphone state information.

In other embodiments, the second signal parameter may also be compared with the preset signal parameter value, and the state information of the earphone may be determined based on the comparison result. For example, the second signal parameter is the signal value detected by the detection module on the second target position, and then all signal values are greater than the preset signal parameter value to determine that the state information is that the earphone is switched between the worn state and the unworn state; in all signal values, when there is any signal value less than or equal to the preset signal parameter value, it is determined that the state information is that the earphone is not switched between the worn state and the unworn state.

Further, in this embodiment, it is determined that the state information is that the earphone is switched between the worn state and the unworn state at the same time or after, the signal change trend corresponding to each current first target position can be acquired. If the signal change trend is a decreasing trend, the state information is determined as the earphone is switched from the worn state to the unworn state, and if the signal change trend is an increasing trend, the state information is determined as the earphone is switched from the unworn state to the worn state.

Further, in this embodiment, after step S40, it also includes: acquiring the fourth signal parameters corresponding to each first target position on the earphone when the earphone is switched between the worn state and the unworn state detected multiple times before the current moment, and acquiring a plurality of fourth signal parameters corresponding to each first target position; adjusting the second target signal parameters according to the plurality of fourth signal parameters corresponding to each first target position. Here, the specific number of times may be a preset fixed number of times, or may be a number of times determined according to an instruction input by the user. In this embodiment, the number of times is 50 times, and in other embodiments, the number of times may be 30 times, 40 times, etc. In each detection process, each first target position corresponds to detection of at least one fourth signal parameter. Specifically, the average value or median of multiple fourth signal parameters corresponding to each first target position can be used as the new second target signal parameter corresponding to the first target position; the average value or median of all fourth signal parameters corresponding to all first target position is used as a new second target signal parameter corresponding to each second target position. During actual use, the position of the user wearing the earphone may change. This change is a habitual change, which is related to wearing comfort, ambient temperature, humidity, etc. This embodiment uses the fourth signal parameter acquired by multiple detections before the current time to adjust the second target signal parameter, which is beneficial to further improving the accuracy of identifying state information related to earphone wearing.

In order to further improve the accuracy of earphone state information detection, the the environmental parameters of the earphone environment corresponding to the detection of multiple fourth signal parameters (such as ambient temperature and/or ambient humidity, etc.) and/or the number of times the user adjusts the earphone position in the wearing state can be adjusted. A parameter adjustment value of the second target signal parameter is determined according to the environmental parameter and/or the number of adjustments and the fourth signal parameter; and the result acquired after adjusting the second target signal parameter according to the parameter adjustment value is used as a new second target signal parameter.

Further, in this embodiment, the number of the first target positions is more than one. After step S40, it also includes: returning to performing the step of detecting the second signal parameter of the first target position, and acquiring at least one second signal parameter;

In the process of cyclically determining the state information of the earphone, when any parameter difference in all parameter differences is greater than the set threshold, it is determined that the state information is that the earphone is not switched between the worn state and the unworn state simultaneously or after, it also includes:

If there is a first target position that satisfies the preset condition, updating statistical number corresponding to the first target position that satisfies the preset condition;

When there is a first target position whose statistical number is greater than the number of sets, returning to the step of acquiring a plurality of first signal parameters detected when the earphone is in the preset mode;

When there is no first target position whose statistical number is greater than or equal to the number of sets, returning to the step of detecting the second signal parameter of the first target position and acquiring at least one second signal parameter;

The preset condition is that the parameter difference corresponding to the first target position is less than or equal to the set threshold, and each first target position has a corresponding statistical number. The statistical number represents the number of times that the corresponding first target position determines that the state information of the earphone satisfies the preset condition when the earphone is not switched between the worn state and the unworn state several times before the current moment.

Specifically, after more than one first target position is determined, the initial value of statistical number corresponding to each first target position is set to 0. In the process of detecting the second signal parameters of the first target position several times and determining the earphone state information based on the detected second signal parameters, in more than one parameter difference corresponding to more than one second signal parameters, if it is detected that at least one parameter difference greater than the set threshold, it is determined that the earphone state information is that the earphone is not switched between the worn state and the unworn state. On this basis, if in more than one parameter difference value, not all parameter difference value is greater than the set threshold, and the parameter difference corresponding to the first target position is less than or equal to the set threshold, it indicates that only part of the signal parameters detected by the first target position meet the wearing trigger condition (that is, only part of the first target positions may come into contact with the user's ears); at this time, the statistical number of the first target position corresponding to the parameter difference value less than or equal to the set threshold is increased once, if the statistical number of all first target positions is less than or equal to the set threshold, then it can enter the next cycle and continue to use the current first target position to identify the earphone state; if there is a first target position with a statistical number greater than the set threshold, it indicates that the current first target position used to determine the earphone state information may exist error, the signal parameters detected in the preset mode is re-acquired and the first target position for determining the earphone state information is re-determined.

Further, when there is a first target position whose statistical number is greater than the number of sets, the connection state information between the earphone and its bound terminal can be further acquired; and if the connection state information is connected, the bound terminal is controlled to output a prompt message to prompt the user to re-perform the wearing calibration (that is, re-entering the preset mode).

Figure 6:
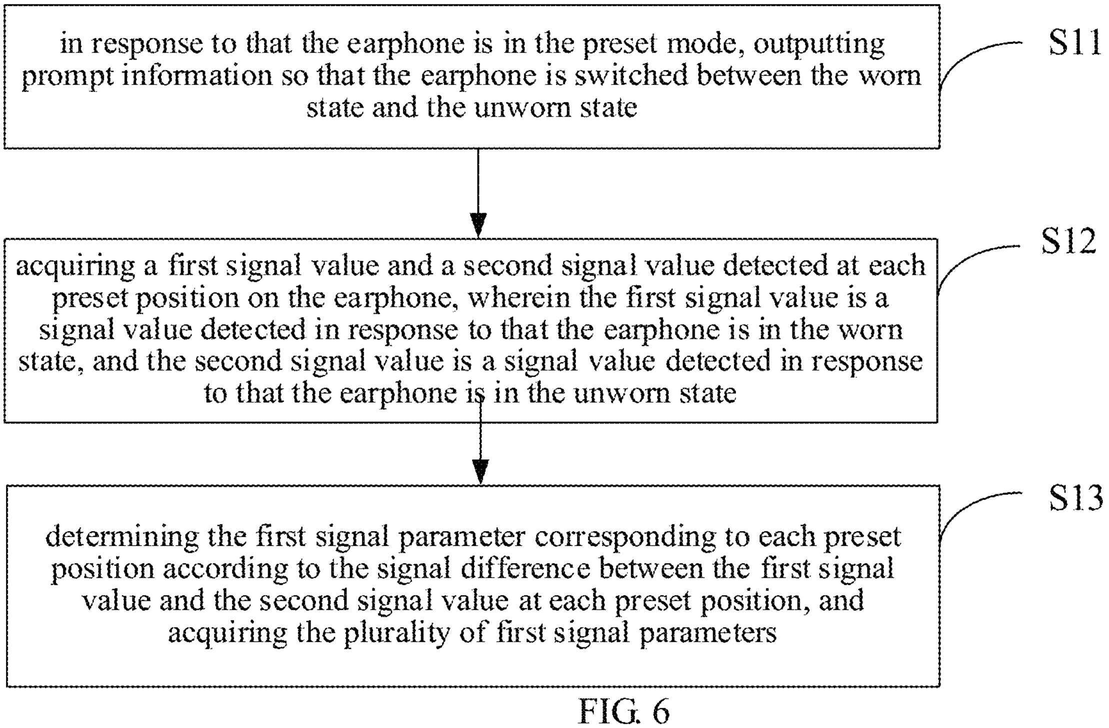
FIG. 6 is a schematic flowchart of the method of detecting earphone state according to still another embodiment of the present application.

Further, based on any of the above-mentioned embodiments, another embodiment of the method of detecting earphone state of the present application is provided. In this embodiment, referring to FIG. 6, step S10 includes:

Step S11, when the earphone is in the preset mode, outputting prompt information so that the earphone is switched between the worn state and the unworn state;

Specifically, the prompt information includes prompt information for prompting the user to wear the earphone in a comfortable manner and to take off the earphone. The prompt information may be information such as sound prompt, text prompt and/or light prompt. Specifically, the terminal (such as a mobile phone) bound to the earphone is controlled to output prompt information.

Furthermore, the prompt information may further include prompt information for prompting the user to wear the earphone in a comfortable manner and take off the earphone, and to perform the preset number of times (for example, 3 times, 4 times, or 5 times, etc.).

Step S12, acquiring the first signal value and the second signal value detected at each preset position on the earphone; the first signal value is the signal value detected when the earphone is in the worn state, and the second signal value is the signal value detected when the earphone is in the unworn state;

Specifically, after the prompt information is output, the signal value detected by the detection module at each preset position is acquired in real time; when the signal value detected by the detection module is monitored to show a unidirectional change trend (such as a gradual increase trend or a gradual decrease trend), the minimum signal value detected at each preset position can be used as the second signal value corresponding to each preset position, and the maximum signal value detected at each preset position can be used as the first signal value corresponding to each preset position; or, when it is detected that the signal value detected by the detection module shows a reciprocating trend (such as first increasing and then decreasing, or first decreasing and then increasing), the maximum value among the signal values continuously detected at each preset position is determined as the first signal value corresponding to each preset position, and the minimum value among the signal values continuously detected at each preset position is determined as the second signal value corresponding to each preset position.

In addition, the state instruction input by the user can also be acquired after the prompt information is output, and the signal value detected at each preset position on the earphone can be acquired as the first signal when the worn state instruction input by the user is received.

Step S13, determining the first signal parameter corresponding to each preset position according to the signal difference between the first signal value of each preset position and its corresponding second signal value, and acquiring the plurality of first signal parameters.

Specifically, the absolute value of the difference between each first signal value and its corresponding second signal value can be used as the first signal parameter of the corresponding preset position; the difference between each first signal value and its corresponding second signal value is directly used as the first signal parameter of the corresponding preset position.

For example, the detected first signal value, the second signal value and the determined first signal parameters corresponding to each preset position are described in the following table:

| preset position | first signal value | second signal value | first signal parameter |
|---|---|---|---|
| position 1 | 500 | 100 | 300 |
| position 2 | 1000 | 100 | 900 |
| . . . | . . . | . . . | . . . |
| position N | 980 | 100 | 880 |

In this embodiment, the above method can accurately acquire the signal conditions actually detected by each preset position on the earphone when the user is actually using the earphone or taking off the earphone, ensuring that all signal parameters at the preset position based on the preset mode can accurately reflect the actual structure of the user's ear, thereby ensuring the effective improvement of the accuracy of the first target position determined based on multiple signal parameters and its application to determine the state information related to wearing the earphone.

In other embodiments, after the prompt information is output, the first signal value can also be detected but not the second signal value, and the signal value when the earphone is not worn is preset as a set value; and then the first signal parameter corresponding to each preset position can be determined according to the signal difference between the first signal value of each preset position and the set value, and the multiple first signal parameters are acquired; or, the detected first signal parameter can also be directly used as the first signal parameter corresponding to each preset position.

In addition, the embodiment of the present application also proposes a computer-readable storage medium; the computer-readable storage medium stores a earphone state detection program, and when the earphone state detection program is executed by a processor, relevant steps of any one of the examples of the above method of detecting earphone state can be implemented.

It should be noted that, as used herein, the term "comprise", "include" or any other variation thereof is intended to cover a non-exclusive inclusion such that a process, method, article or system comprising a set of elements includes not only those elements, but also includes other elements not expressly listed, or elements inherent in the process, method, article, or system. Without further limitations, an element defined by the phrase "comprising a . . . " does not preclude the presence of additional identical elements in the process, method, article or system comprising that element.

The serial numbers of the above embodiments of the present application are for description only, and do not represent the advantages and disadvantages of the embodiments.

Through the description of the above embodiments, those skilled in the art can clearly understand that the methods of the above embodiments can be implemented by means of software plus a necessary general-purpose hardware platform, and of course also by hardware, but in many cases the former is better implementation. Based on such an understanding, the technical solution of the present application can be embodied in the form of a software product in essence or in other words, the part that contributes to the related art, and the computer software product is stored in a storage medium (such as ROM/RAM, magnetic disk, optical disk) as described above, including several instructions to make a terminal device (which may be a mobile phone, computer, server, earphone, or network device, etc.) execute the method described in each embodiment of the present application.

The above are only some embodiments of the present application, and are not intended to limit the patent scope of the present application. Any equivalent structure or equivalent process conversion made by using the description of the present application and the contents of the accompanying drawings, or directly or indirectly used in other related technical fields, are all included in the scope of patent protection of the present application in the same way.

What is claimed is:

1. A method of detecting earphone state, comprising:

acquiring a plurality of first signal parameters detected in response to that an earphone is in a preset mode, wherein in the preset mode, the earphone is in a worn state or the earphone is switched between the worn state and an unworn state, and different first signal parameters are configured to correspond to different preset positions on the earphone;

determining at least one preset position among a plurality of preset positions as a first target position according to the plurality of first signal parameters;

detecting second signal parameters of the first target position to acquire at least one second signal parameter; and determining state information of the earphone according to the at least one second signal parameter, wherein the state information indicates whether the earphone is switched between the worn state and the unworn state;

wherein the determining the state information of the earphone according to the at least one second signal parameter comprises:

determining a parameter difference between each of the second signal parameters and a second target signal parameter, and acquiring at least one parameter difference; wherein the second target signal parameter is a target value that a signal parameter detected by the first target position needs to reach in response to that the earphone is switched between the worn state and the unworn state;

in response to that all parameter differences are less than or equal to a set threshold, determining that the state information is that the earphone is switched between the worn state and the unworn state; and in response to that any parameter difference among all parameter differences is greater than the set threshold, determining that the state information is that the earphone is not switched between the worn state and the unworn state;

wherein a number of the first target position is more than one; after the determining the state information of the earphone according to the at least one second signal parameter, the method further comprises: returning to the performing the detecting the second signal parameter of the first target position to acquire at least one second signal parameter;

in a process of cyclically determining the state information of the earphone, at the same time or after the in response to that any parameter difference among all parameter differences is greater than the set threshold, determining that the state information is that the earphone is not switched between the worn state and the unworn state, the method further comprises:

in response to that the first target position meets a preset condition, updating a number of statistics corresponding to the first target position meeting the preset condition;

in response to that there is the first target position whose statistical number is greater than a number of sets, returning to the performing the acquiring the plurality of first signal parameters detected in response to that the earphone is in the preset mode; and in response to that there is no first target position whose statistical number is greater than or equal to the number of sets, returning to the performing the detecting second signal parameters of the first target position to acquire at least one second signal parameter;

wherein, the preset condition is that the parameter difference corresponding to the first target position is less than or equal to the set threshold; each first target position has a corresponding statistical number, and the statistical number represents: the number of times that a corresponding first target position satisfies the preset condition, in response to that the state information of the earphone is determined several times before a current moment to be that the earphone is not switched between the worn state and the unworn state.

2. The method of detecting earphone state according to claim 1, wherein the determining at least one preset position among the plurality of preset positions as the first target position according to the plurality of first signal parameters comprises:

determining a preset number of target parameters among the plurality of first signal parameters, wherein the preset number of target parameters is greater than other first signal parameters among the plurality of first signal parameters; and determining the preset position corresponding to each target parameter as the first target position respectively.

3. The method of detecting earphone state according to claim 1, wherein after the determining at least one preset position among the plurality of preset positions as the first target position according to the plurality of first signal parameters, the method further comprises:

determining the preset position other than the first target position among the plurality of preset positions as a second target position;

detecting a third signal parameter of the second target position, and performing the detecting the second signal parameter of the first target position to acquire at least one second signal parameter;

determining whether the earphone is in a target state according to the third signal parameter, or determining whether the earphone is in the target state according to the third signal parameter and the second signal parameter; wherein the target state is an earphone state switching caused by contact between the earphone and an object other than the ear;

in response to that the earphone is not in the target state, performing the determining the state information of the earphone according to the at least one second signal parameter; and in response to that the earphone is in the target state, determining that the earphone is not switched between the worn state and the unworn state.

4. The method of detecting earphone state according to claim 3, wherein the determining whether the earphone is in the target state according to the third signal parameter comprises:

in response to that the third signal parameter is greater than a first target signal parameter, determining that the earphone is in the target state; in response to that the third signal parameter is less than or equal to the first target signal parameter, determining that the earphone is not in the target state; or the determining whether the earphone is in the target state according to the third signal parameter and the second signal parameter comprises:

in response to that both the second signal parameter and the third signal parameter are greater than the first target signal parameter, determining that the earphone is in the target state; in response to that the second signal parameter is greater than the first target signal parameter, and the third signal parameter is less than or equal to the first target signal parameter, determining that the earphone is not in the target state.

5. The method of detecting earphone state according to claim 4, wherein after the determining the preset position other than the first target position among the plurality of preset positions as the second target position, the method further comprises:

increasing the first signal parameter corresponding to the second target position according to a preset parameter adjustment value to acquire the first target signal parameter.

6. The method of detecting earphone state according to claim 1, wherein, before the determining the parameter difference between each of the second signal parameters and the second target signal parameter, and acquiring at least one parameter difference, the method further comprises:

determining the second target signal parameter according to the first signal parameter corresponding to each of the first target positions.

7. The method of detecting earphone state according to claim 6, wherein after the determining the state information of the earphone according to the at least one second signal parameter, the method further comprises:

acquiring fourth signal parameters corresponding to each first target position on the earphone in response to that the earphone is switched between the worn state and the unworn state detected multiple times before the current moment, and acquiring a plurality of fourth signal parameters corresponding to each first target position respectively; and adjusting the second target signal parameter according to the plurality of fourth signal parameters corresponding to each first target position respectively.

8. The method of detecting earphone state according to claim 1, wherein the acquiring the plurality of first signal parameters detected in response to that the earphone is in the preset mode comprises:

in response to that the earphone is in the preset mode, outputting prompt information so that the earphone is switched between the worn state and the unworn state;

acquiring a first signal value and a second signal value detected at each preset position on the earphone, wherein the first signal value is a signal value detected in response to that the earphone is in the worn state, and the second signal value is a signal value detected in response to that the earphone is in the unworn state; and determining the first signal parameter corresponding to each preset position according to the signal difference between the first signal value and the second signal value at each preset position, and acquiring the plurality of first signal parameters.

9. A non-transitory computer-readable storage medium, wherein an earphone state detection program is stored on the non-transitory computer-readable storage medium, and when the earphone state detection program is executed by a processor, the steps of the method of detecting earphone state according to claim 1 are realized.

* * * * *